United States Patent
Das

(10) Patent No.: US 7,912,037 B2
(45) Date of Patent: Mar. 22, 2011

(54) INTEGRATING MOBILITY AGENTS FOR SHORT MESSAGING SERVICES

(75) Inventor: Kaustubh Das, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1854 days.

(21) Appl. No.: 11/018,111

(22) Filed: Dec. 20, 2004

(65) Prior Publication Data

US 2006/0133347 A1 Jun. 22, 2006

(51) Int. Cl.
*H04L 12/66* (2006.01)
(52) U.S. Cl. .......... 370/352; 340/10.41; 455/552.1
(58) Field of Classification Search .......... 455/435.1, 455/433, 436, 432.3, 412.1, 414.1, 423, 456.5, 455/574, 338, 448, 552.1; 370/328, 337, 370/352, 437, 338, 331, 465, 329; 709/227; 340/10.41

See application file for complete search history.

(56) References Cited

U.S. PATENT DOCUMENTS

| | | | | |
|---|---|---|---|---|
| 5,889,474 A * | 3/1999 | LaDue | | 340/825.49 |
| 5,889,770 A * | 3/1999 | Jokiaho et al. | | 370/337 |
| 6,161,008 A * | 12/2000 | Lee et al. | | 455/415 |
| 6,771,623 B2 * | 8/2004 | Ton | | 370/331 |
| 6,904,033 B1 * | 6/2005 | Perras et al. | | 370/338 |
| 6,958,993 B2 * | 10/2005 | Ryu | | 370/352 |
| 6,980,801 B1 * | 12/2005 | Soininen et al. | | 455/435.1 |
| 7,027,801 B1 * | 4/2006 | Hall et al. | | 455/412.1 |
| 7,039,404 B2 * | 5/2006 | Das et al. | | 455/435.1 |
| 7,061,894 B2 * | 6/2006 | Pang et al. | | 370/338 |
| 7,092,716 B2 * | 8/2006 | Nizri et al. | | 455/448 |
| 7,177,628 B2 * | 2/2007 | Sommers et al. | | 455/414.1 |
| 7,177,636 B2 * | 2/2007 | Oda et al. | | 455/426.1 |
| 7,204,746 B2 * | 4/2007 | Purkayastha et al. | | 455/552.1 |
| 7,324,474 B2 * | 1/2008 | Shirota et al. | | 370/328 |
| 7,324,478 B2 * | 1/2008 | Park et al. | | 370/331 |
| 7,324,543 B2 * | 1/2008 | Wassew et al. | | 370/437 |
| 7,356,595 B2 * | 4/2008 | Soininen et al. | | 709/227 |
| 7,466,719 B2 * | 12/2008 | Xu et al. | | 370/465 |
| 7,561,876 B2 * | 7/2009 | Chiou et al. | | 455/423 |
| 2001/0048673 A1 * | 12/2001 | Verkama et al. | | 370/329 |
| 2002/0049059 A1 * | 4/2002 | Soininen et al. | | 455/439 |
| 2003/0208601 A1 * | 11/2003 | Campbell et al. | | 709/227 |
| 2005/0238002 A1 * | 10/2005 | Rasanen | | 370/352 |
| 2005/0249194 A1 * | 11/2005 | Sahaya et al. | | 370/352 |
| 2006/0121916 A1 * | 6/2006 | Aborn et al. | | 455/456.5 |
| 2006/0146781 A1 * | 7/2006 | Adrangi et al. | | 370/349 |
| 2007/0049354 A1 * | 3/2007 | Jin et al. | | 455/574 |
| 2007/0070936 A1 * | 3/2007 | Stamoulis et al. | | 370/328 |
| 2007/0082645 A1 * | 4/2007 | Malomsoky et al. | | 455/338 |
| 2007/0135159 A1 * | 6/2007 | Sinivaara | | 455/552.1 |
| 2007/0286165 A1 * | 12/2007 | Chu et al. | | 370/352 |
| 2009/0073965 A1 * | 3/2009 | Dowling et al. | | 370/352 |
| 2009/0170519 A1 * | 7/2009 | Wilhoite et al. | | 455/436 |

* cited by examiner

*Primary Examiner* — Gerald Gauthier
(74) *Attorney, Agent, or Firm* — Marger Johnson & McCollom, P.C.

(57) ABSTRACT

A method of providing messaging services for GSM or 3G mobile stations is provided. A gateway detects a mobile network registration from a mobile station, and performs a location area update procedure with previous support nodes from its home public land mobile network. The gateway then receives data for the mobile station from a packet switched radio network and transmits the data for the mobile station through the mobile network.

27 Claims, 4 Drawing Sheets

INTEGRATING MOBILITY AGENTS FOR SHORT MESSAGING SERVICES

BACKGROUND

Short messaging services are generally available in some wireless networks, such as those based upon General Packet Radio Systems (GPRS). GSM (Global System for Mobile Communications) operators that provide these services in GPRS networks rely upon these services as revenue generators, and users rely upon them for enhanced communication services. GPRS is seen as some as a bridge between GSM, which is considered second-generation wireless communications and the completely packetized, high bandwidth wireless communication protocol envisioned as third generation (3G).

Short messaging services may include SMS (Short Message Service) and MMS (Multimedia Message Service), among others. In many instances, MMS is considered to be a variation of SMS, in that MMS involves an SMS notification followed by a pull of the multimedia content. In addition, the principles discussed herein are applicable to transmissions of data traffic. These will be referred to here as short messaging services.

These services are currently unavailable in internetworked wireless local area networks (WLANs). An internetworked WLAN is one in which the WLAN may have third generation (3G) protocols and GSM intermixed with Wireless Fidelity (WiFi)-compliant protocols. Wi-Fi protocols are those substantially in compliant with the Institute for Electrical and Electronic Engineers (IEEE) specification 802.11a/b/g, etc., "IEEE Standard for Information Technology—Telecommunications and Information Exchange between Systems—Local and Metropolitan Area Network—Specific Requirements—Part 11: Wireless LAN Medium Access Control (MAC) and Physical Layer (PHY) Specifications." The non-3G or non-GSM portions of the LAN do not provide short messaging services. Users having a 3G provider no longer have access to their short messaging services.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
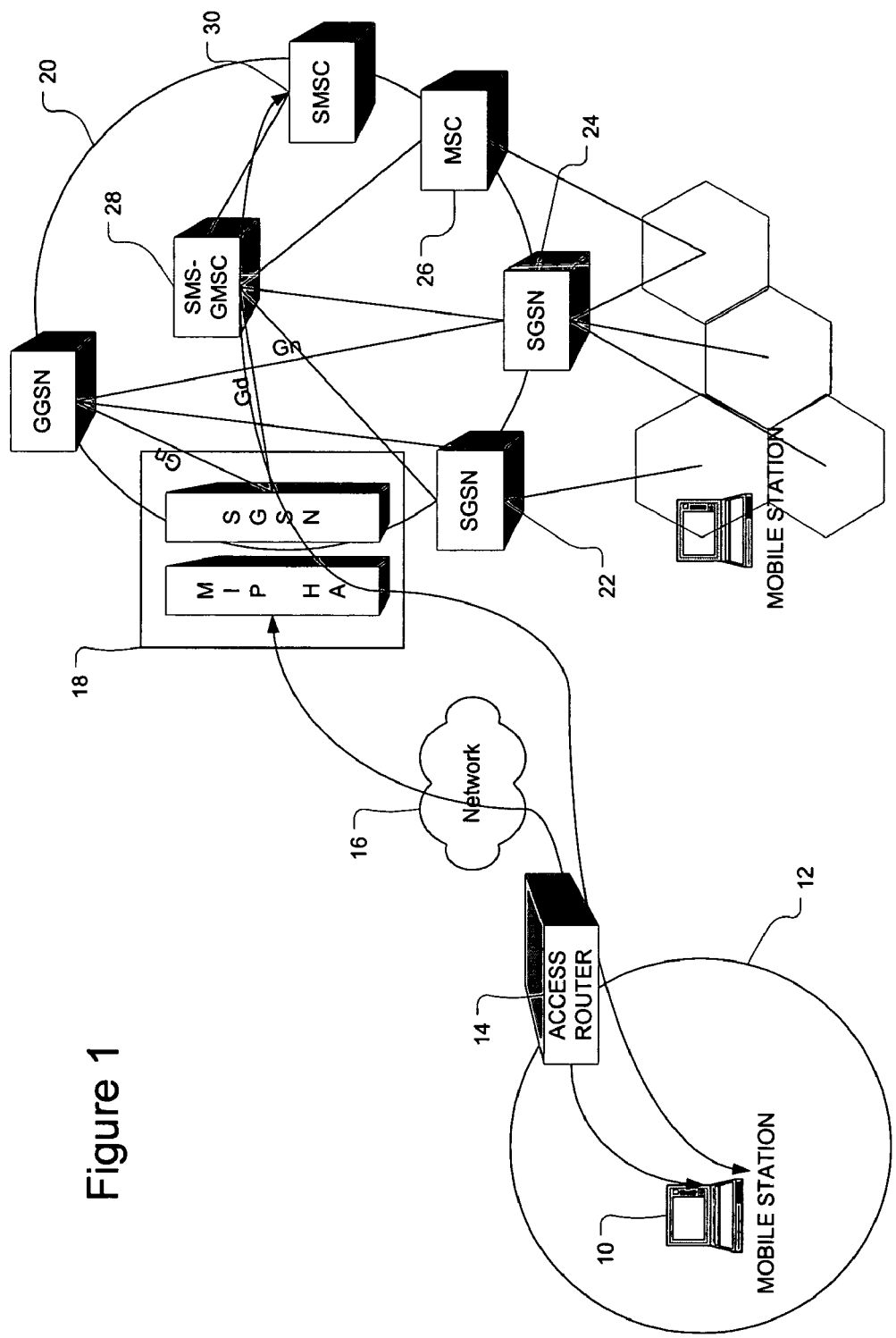
FIG. 1 shows an embodiment of a network device providing messaging services between a wireless local area network and a packet switched radio network.

FIG. 1 shows a mobile station 10 in a wireless local area network 12. The mobile station 10 has a home network 20 that in this case is a packet switched radio network, such as a General Packet Switched Radio System (GPRS). The home network may also be referred to a Public Land Mobile Network (PLMN), as it is a land-based, as opposed to satellite, mobile network, similar to a publicly switched telephone network (PSTN) for traditional telephone systems.

GPRS may be viewed as an intermediate step between current second generation (2G) wireless systems, such as the Global System for Mobile Communications (GSM) networks, and the non-connection oriented, packet switched systems such as a third generation network (3G), as well as further generations such as 4G. GPRS endeavors to use existing GSM network elements as much as possible, and may provide data rates from 9.6 to 171 kilobits per second (kbps). The advent of 3G networks is projected to require completely new network elements to provide data rates of 384 kbps. Application of the embodiments of this invention are not limited to the use of a wireless mobile network with a GPRS network, it may be applied to use of a wireless mobile network to 3G systems as well.

When a mobile station such as 10 is in a wireless local area network, such as one in accordance with the Institute of Electrical and Electronic Engineers (IEEE) standard 802.11a/b/g (WiFi), it reaches its home network through an access router such as 14. The WiFi network may be referred to here as a mobile network. In one embodiment, the mobile network is an IP mobile network that supports mobile nodes. The access router provides access across a network 16, such as the Internet, through a gateway entity 18 to the packet switched radio network 20, which may be a GPRS network. For ease of discussion, GPRS entities will be discussed, with the understanding that embodiments of the invention may be applied to those entities in other networks that are analogous to the entities in GPRS.

However, the mobile station 10 may lose some of its services when in a WiFi network. The GPRS network has several entities and interfaces that allow for packet-switched radio communications. Among these entities are a serving GPRS support node (SGSN) such as 22 and 24, a gateway GPRS support node (GGSN), a gateway mobile services switching center (GSMC) such as 28, short messaging servers (SMS), short message switching center (SMSC) 30 and a mobile switching center 26.

Generally, with the network 20, the mobile stations communicate using the SGSNs and the MSCs, which route their traffic through the network. GGSNs transmit the traffic to and from the home network to mobile stations on other networks. The SMS-GMSC and the SMC-SC are involved when that traffic is short messages, such as those sent using SMS and MMS. Currently, a mobile station such as 10 cannot receive SMS, MMS and other packet-based messages addressed to it when the mobile station is in the wireless local area network, such as 12.

It is possible to provide a new gateway entity, such as 18, that combines a packet switched radio network interface, such as an SGSN interface, with a mobile network interface such as a Mobile Internet Protocol Home Agent (MIP HA). A MIP Home Agent resides in edge devices of a Mobile IP network and intercepts traffic intended for a mobile station that is associated with that agent. The MIP Home Agent then routes the traffic to the mobile station. This allows the mobile station to move around and only need to keep one entity apprised of its location.

The mobile agent updates its associated home agent through a process referred to as registration. Whenever a mobile station moves from one domain of a network to another, it sends a message to its home agent identifying in which domain it is operating and providing its 'forwarding' address. Traffic entering the home network addressed to the mobile station is then routed to its forwarding address by the home agent.

Similarly, in packet switched radio networks, such as GPRS, a serving GPRS Support node (SGSN), provides traffic forwarding to the mobile station. The SGSN, GGSN and a Home Location Register (HLR) track the mobile station's addresses as it moves. The update to these support nodes is usually referred to as a location area update.

The new gateway entity 18 combines the functions of a home agent with a packet switched radio interface such as an SGSN, which may be viewed as being analogous to a home agent for mobile stations in a GPRS network. This network device has a mobile network interface to allow mobile station communication through a wireless local area network, and a packet switched radio network interface to provide messaging services from a packet switched radio network.

A processor in the network device 18 detects the registration of a mobile station through the mobile network interface, triggered by the mobile station being in a wireless local area network, such as a WiFi hotspot. The processor then performs a local area update procedure with support nodes on the packet switched radio network, and transmits data intended for the mobile station from the packet switched radio network to the mobile network.

As discussed above, the mobile network interface may be a Mobile Internet Protocol Home Agent interface. The packet switched radio network interface may be a General Packet Switched Radio Serving GPRS Support Node interface. Alternatively, the packet switched radio network interface may be a 3G interface.

Figure 2:
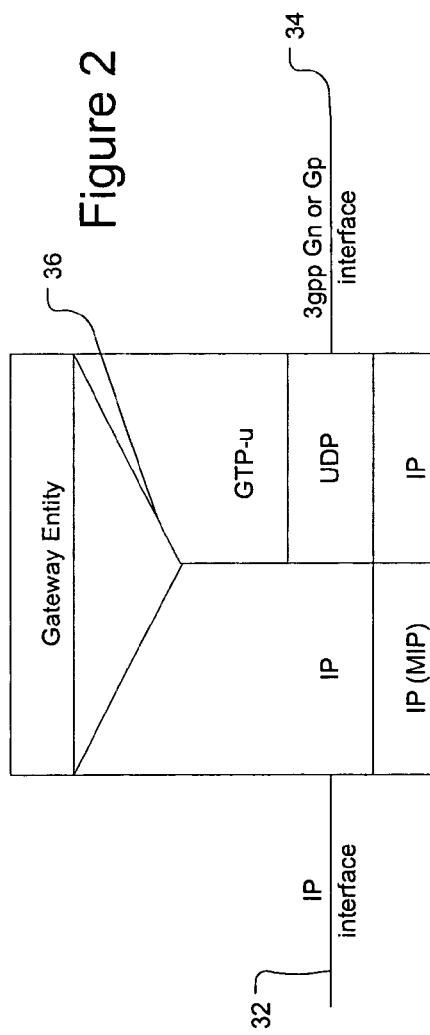
FIG. 2 shows an embodiment of a network device having a packet switched radio system interface and a mobile network interface co-located.

The two interfaces may be tightly integrated, in which case they are referred to as being co-located. In a co-located instance, for example, a MIP registration may cause application programming interface (API) calls to the SGSN function that would in turn trigger a location area update and redirection of the packets to the home agent. An example of this is shown in FIG. 2.

The incoming mobile network interface is referred to here as an Internet Protocol (IP) interface 32. The outgoing interface is a 3GPP (3G Partnership Project) Gn or Gp interface 34. The protocol stack in side the processor is shown at 36. Several interfaces have been described by the 3GPP and labeled Gn, Gp and Gb, as 20 examples. A Gn interface is an interface between two GGSNs in the same public land mobile network. A Gp interface is an interface between two GGSNs in different PLMNs. A Gb interface is between a SGSN and a base station system.

Figure 3:
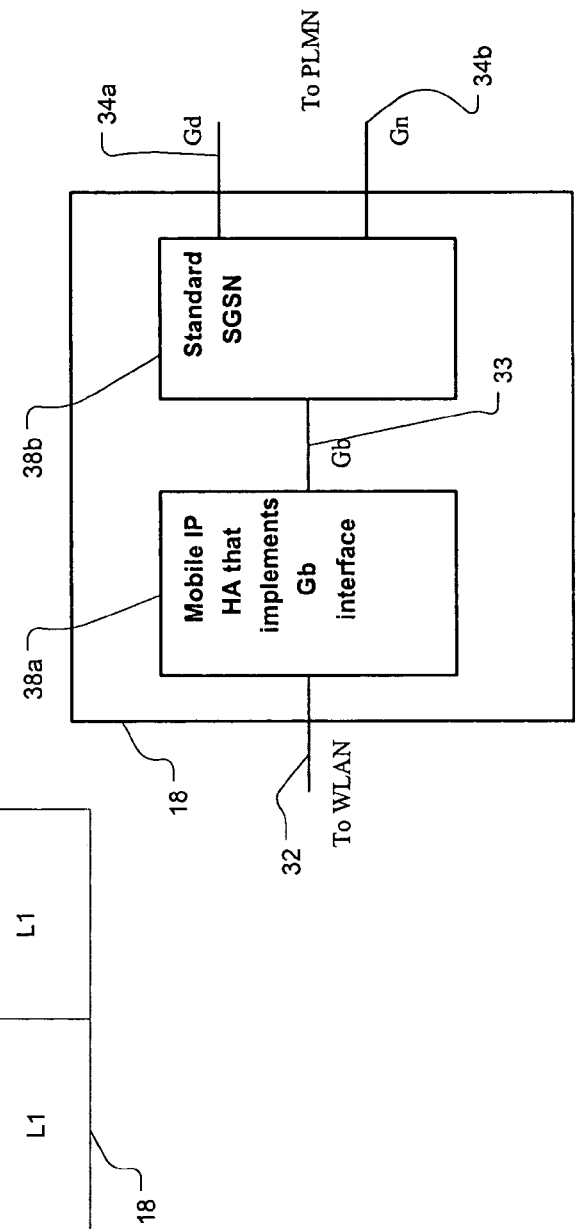
FIG. 3 shows an embodiment of a network device having a packet switched radio system interface and a mobile network interface non-co-located.

An embodiment where the two interfaces are non-co-located is shown in FIG. 3. In the non-co-located case, the device would also include a Gb interface 33 between the mobile network interface 38*a*, shown as a MIP Home Agent in FIG. 3, and the packet radio interface 38*b*. In this instance a Gd interface 34*a* and a Gn interface 34*b* connect the packet radio interface to the packer radio network. A Gd interface lies between an SMS-GMSC.

It must be noted that co-located and non-co-located do not necessarily imply physical location. The network device including these interfaces may be one physical device, or several physical devices, whether the interfaces are co-located or non-co-located.

Returning to FIG. 1, the mobile station 10 may use the new gateway entity 18 to receive services from its home PLMN that would not otherwise be available in the WLAN 12. As mentioned above, the mobile station may be a GSM mobile station or a 3G mobile station, as well as any other type of packet switched wireless network mobile station.

Figure 4:
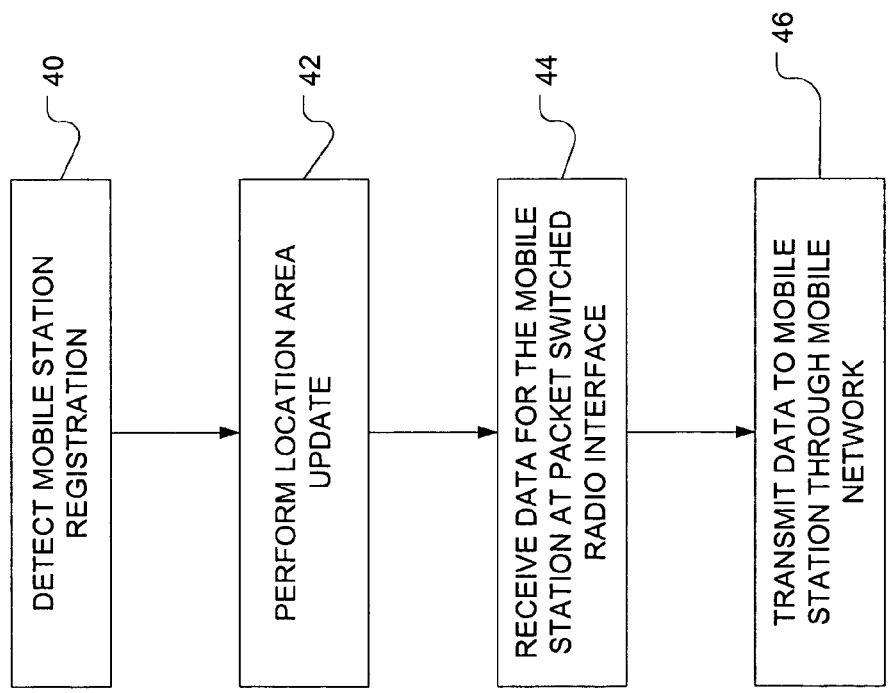
FIG. 4 shows an embodiment of a method to provide messaging services to a mobile station in a wireless local area network.

An embodiment of a method to provide these services using this new network entity is shown in FIG. 4. At 40, the gateway entity detects a mobile station registration. In the above examples, a Mobile IP registration process was assumed, but it may be a different type of mobile station registration. In response to detecting the registration, the gateway then performs a location area update at 42, such as that provided in GPRS. This updates relevant support nodes of the new location information for the mobile station. As discussed above, this may occur as a result of API calls to the SGSN functionality in the device, or through communications through a Gb interface in the non-co-located embodiment.

Once the location area update is completed, the gateway entity can now receive messaging traffic for the mobile station from the short message service providers in the PLMN at 44. This may involve the home agent intercepting packets transmitting through the gateway entity and tunneling them to the mobile station via the home agent at 46. In this manner, the mobile station may still receive short messaging services in a wireless local area network that would otherwise be unavailable.

As mentioned above, implementations of GPRS generally attempt to re-use existing network entities in the GSM network. In this instance, embodiments of the invention may be contained upon an article of machine-readable medium that, when executed, cause the machine to perform the methods and processes of the invention. The machine may be an existing gateway entity that is being upgraded to provide the new functionality, for example.

Figure 5:
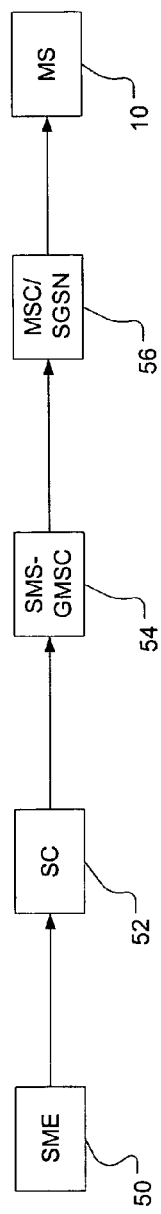
FIG. 5 shows an embodiment of a messaging diagram for a third generation (3G) network.
Figure 6:
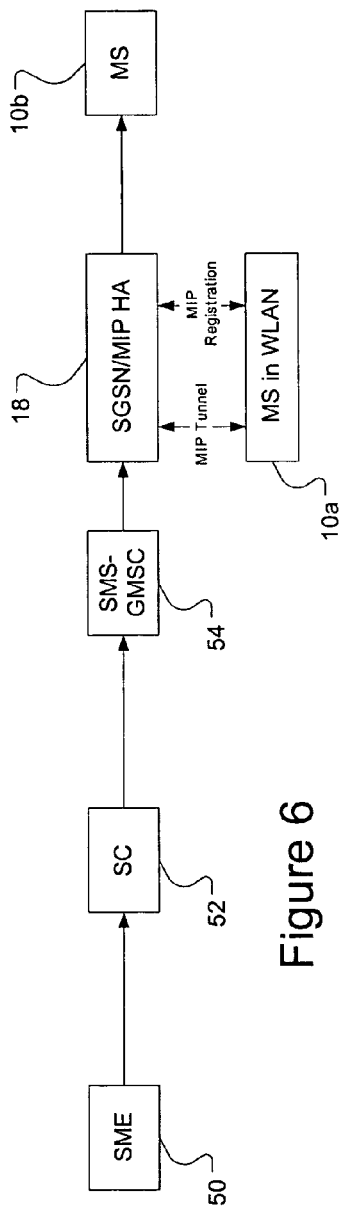
FIG. 6 shows an embodiment of a messaging diagram for a mobile station using a mobile network and a packet switched radio network.
Figure 7:
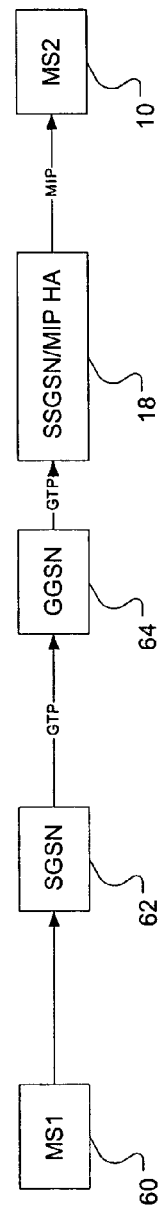
FIG. 7 shows an embodiment of a messaging diagram for packet services between two mobile stations.

Messaging diagrams showing examples of messaging flows in different situations are shown in FIGS. 5-7. In FIG. 5, a messaging flow is shown for a standard short message service where the mobile station is in a different PLMN than its home PLMN. A short messaging entity transmits the message to a switching center 52. This is then transmitting to a short message service gateway mobile switching center (SMS-GMSC) 54 that sends the message to the PLMN in which the mobile station currently resides. This is received by the SGSN Mobile Switching Center 56 that in turn relays it to the mobile station 10.

In FIG. 6, the new gateway entity allows the mobile station to receive short messaging services at either the WLAN as shown at 10*a*, or in its home PLMN at 10*b*. The SME 50 sends the message to the SC 52, which in turn transmits it to the appropriate SMS-GMSC. The SMS-GMSC then transmits it to the new gateway entity 18. If the mobile station is in a WLAN area, as determined by the MIP registration, the gateway 18 tunnels the data to the mobile station 10*a*. It must be noted that the new gateway 18 will still perform the usual SGSN functions if the mobile station is in a PLMN as shown by 10*b*.

In addition to allowing mobile stations to receive their short message service traffic, such as SMS or MMS, it also allows for access to regular packet switching services from the WLAN. It may provide continuity of access for these kinds of services. This is demonstrated by the packet flow between two mobile stations in FIG. 7.

Mobile station 1 (MS1) 60 transmits packet data intended for mobile station 2 (MS2) 10, which is currently in a WLAN area. The SGSN 62 supports MS2 and sends the packet data to the GGSN 64. This is typically accomplished via GPRS tunneling protocol (GTP). The GGSN then transmits the data to the appropriate new gateway entity 18, again typically by GTP. The new gateway 18 then uses Mobile IP to tunnel the data to the MS2 in the WLAN.

In this manner, the addition of the new gateway entity enables not only mobile stations from a PLMN to receive their short message service messages, but also to receive packet services from other mobile stations in the PLMN. The mobile stations may be GSM or 3G stations that can communicate over GPRS, as examples.

Thus, although there has been described to this point a particular embodiment for a method and apparatus to provide short messaging services to mobile stations in WLAN environments, it is not intended that such specific references be considered as limitations upon the scope of this invention except in-so-far as set forth in the following claims.

What is claimed is:

1. A method of providing messaging services, comprising:
   detecting a mobile station registration of a mobile station within a mobile network;
   performing a location area update procedure with previous support nodes;
   receiving short message service data for the mobile station from a packet switched radio network; and
   transmitting the short message service data for the mobile station through the mobile network.

2. The method of claim 1, detecting a mobile station registration further comprising detecting a Mobile Internet Protocol registration.

3. The method of claim 1, performing a location area update further comprising performing application programming interface calls to a packet switched radio network interface to cause the location area update.

4. The method of claim 1, performing a location area update further comprising performing calls to a packet switched radio network interface through a Gb interface.

5. The method of claim 1, performing a location area update procedure further comprising performing a General Packet Switched Radio Location Area Update.

6. The method of claim 1, performing a location area update procedure with previous support nodes further comprising performing a location area update procedure with at least one of a Serving GPRS Support Node, a Gateway GPRS Support Node and a Home Location Register previously associated with the mobile station.

7. The method of claim 1, receiving short message service data further comprising receiving one of either a Short Message Service message or a Multimedia Message Service message.

8. The method of claim 1, transmitting the short message service data for the mobile station through the mobile network further comprising:
   intercepting packets from a packet switched radio network interface; and
   tunneling them through a wireless local area network to the mobile station.

9. A network device, comprising:
   a mobile network interface to allow mobile station communication through a wireless local area network;
   a packet switched radio network interface to provide short messaging services from a packet switched radio network; and
   a processor to:
      detect registration of a mobile station through the mobile network interface;
      perform a local area update procedure with support nodes on the packet switched radio network; and
      transmit short message service data from the packet switched radio network to the mobile station.

10. The device of claim 9, the mobile network interface further comprising a Mobile Internet Protocol Home Agent.

11. The device of claim 9, the packet switched radio network interface further comprising a General Packet Switched Radio Serving GPRS Support Node.

12. The device of claim 9, the packet switched radio network interface further comprising a 3G interface.

13. The device of claim 9, the mobile network interface and the packet switched radio network interface being co-located.

14. The device of claim 9, the mobile network interface and the packet switched radio interface being non-co-located, and the device further comprising a Gb interface between the mobile network interface and the packet switched radio interface.

15. The device of claim 9, wherein the short message service data comprises one of either a Short Message Service message or a Multimedia Message Service message.

16. A system, comprising:
   a mobile station; and
   a network device having a mobile network interface and a packet switched radio interface to allow the mobile station to communicate short message service data with a packet switched radio network.

17. The system of claim 16, the mobile station further comprising a GSM mobile station.

18. The system of claim 16, the mobile station further comprising a 3G mobile station.

19. The system of claim 16, the network device having a mobile network interface further comprising the network device having a Mobile Internet Protocol Home Agent.

20. The system of claim 16, the network device having a packet switched radio interface further comprising the network device having a GPRS interface.

21. The system of claim 16, the network device having a packet switched radio interface further comprising the network device having a 3G interface.

22. The system of claim 16, wherein the short message service data comprises one of either a Short Message Service message or a Multimedia Message Service message.

23. An article of machine-readable medium containing instructions that, when executed, cause a machine to:
   detect a mobile station registration of a mobile station within a mobile network;
   perform a location area update procedure with previous support nodes;
   receive short message service data for the mobile station from a packet switched radio network; and
   transmit the short message service data for the mobile station through the mobile network.

24. The article of claim 23, the instructions that, when executed, cause the machine to perform a location area update further cause the machine to perform application programming interface calls to a packet switched radio network interface to cause the location area update.

25. The article of claim 23, the instructions that, when executed, cause the machine to perform a location area update further cause the machine to perform calls to a packet switched radio network interface through a Gb interface.

26. The article of claim 25, the instructions that, when executed, cause the machine to receive short message service data further cause the machine to receive one of either a Short Message Service message or a Multimedia Message Service message.

27. The article of claim 23, the instructions that, when executed, cause the machine transmit the short message service data for the mobile station through the mobile network further cause the machine to:
   intercept packets from the packet switched radio network interface; and
   tunnel them through a wireless local area network to the mobile station.

* * * * *